Sept. 2, 1958 C. A. SMITH ET AL 2,850,257
GAS VALVE

Filed July 7, 1955 4 Sheets-Sheet 1

INVENTORS
CARL A. SMITH
HOWARD R. KINSELLA
BY Charles E. Markham
THEIR AGENT

Sept. 2, 1958 C. A. SMITH ET AL 2,850,257
GAS VALVE
Filed July 7, 1955 4 Sheets-Sheet 2

INVENTORS
CARL A. SMITH
HOWARD R. KINSELLA
BY *Charles E. Markham*
THEIR AGENT

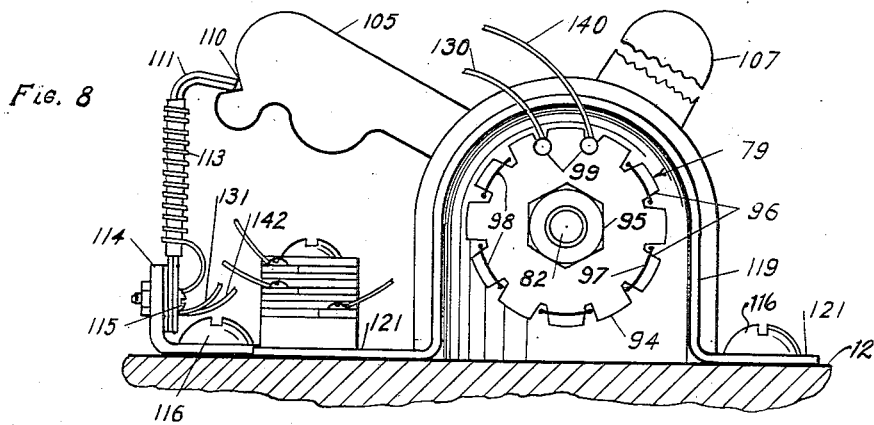
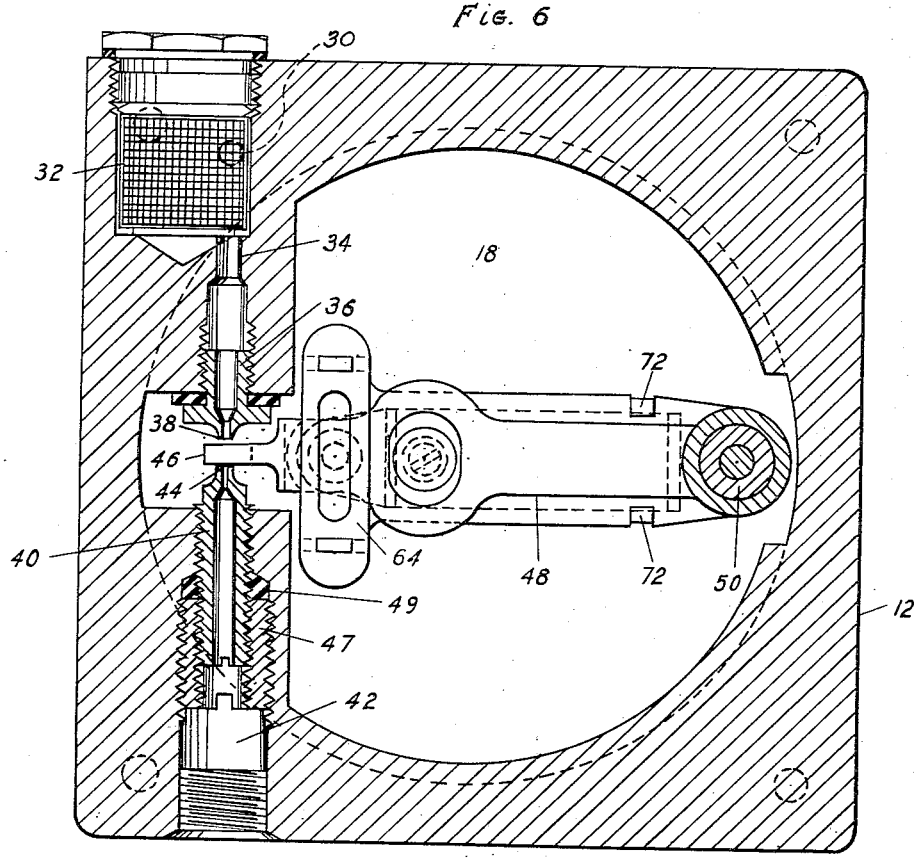

Sept. 2, 1958  C. A. SMITH ET AL  2,850,257
GAS VALVE
Filed July 7, 1955  4 Sheets-Sheet 4
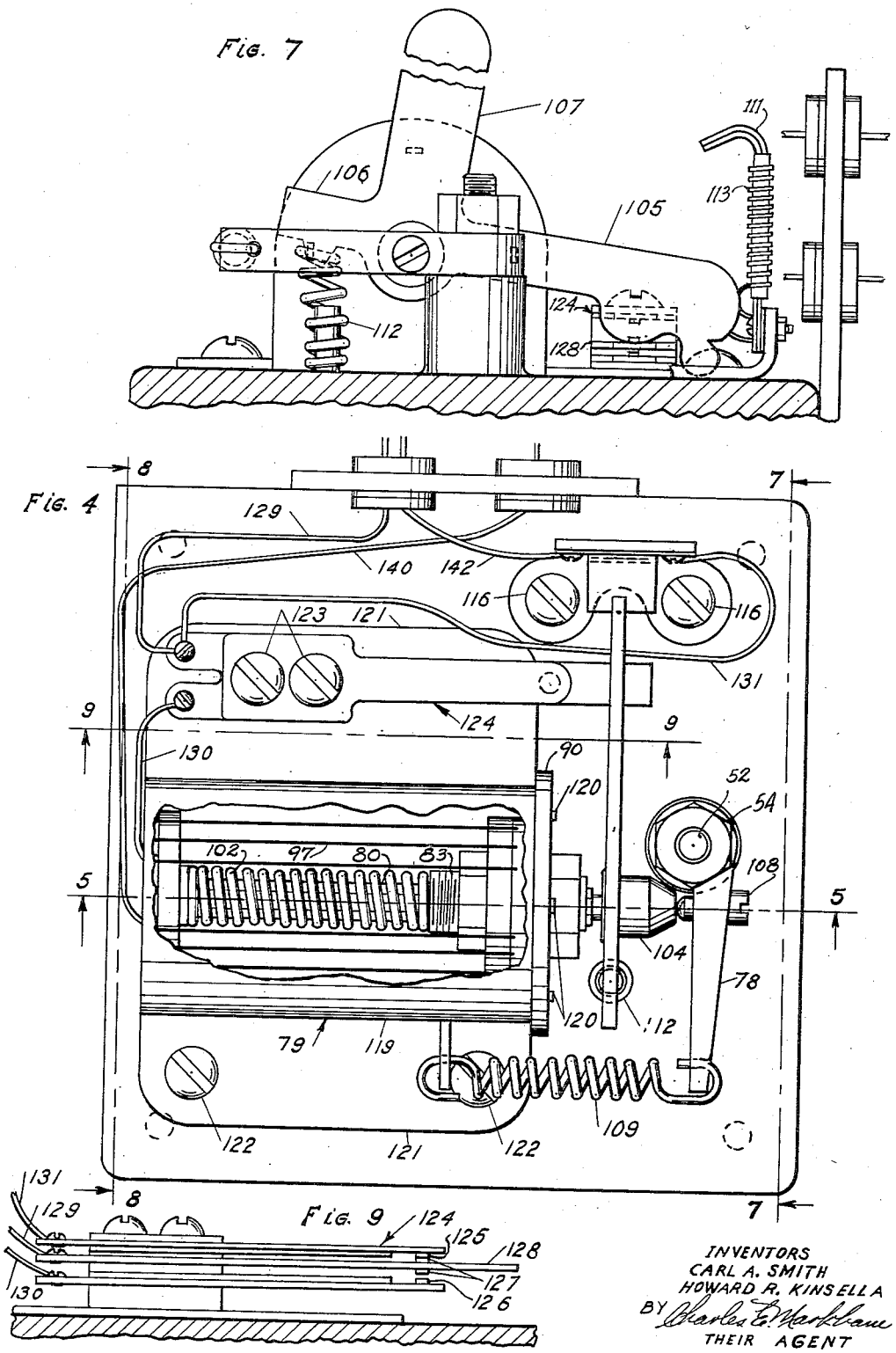
INVENTORS
CARL A. SMITH
HOWARD R. KINSELLA
BY Charles E. Markham
THEIR AGENT United States Patent Office 2,850,257
Patented Sept. 2, 1958

2,850,257

GAS VALVE

Carl A. Smith and Howard R. Kinsella, Jr., Affton, Mo., assignors, by mesne assignments, to White-Rodgers Company, a corporation of Delaware Application July 7, 1955, Serial No. 520,510

7 Claims. (Cl. 251—11)

This invention relates to a diaphragm-type gas valve and its actuation.

An important advantage of the diaphragm-type gas valve over the conventional solenoid valve in domestic heating service is a reduction in operating noise which is usually amplified and transmitted through the pipes in which the valve is connected and becomes objectionable. While the valve noise itself is minimized in the diaphragm-type valve, the operational noise of the electromagnetic actuator conventionally employed for actuation of the diaphragm pilot valve is still found to be objectionable.

The present invention has for its primary object the provision of a generally new and improved diaphragm-type gas valve which is fast acting and completely quiet in operation.

A further object is the provision of a novel thermoelectric valve actuator which is quick acting and completely quiet in operation.

A further object is to provide a thermally expanding, wire-type, valve actuator through which electrical current is passed to heat the wire, which actuator is constructed so that in event the wire breaks or is melted by an unexpected high voltage surge the actuator will return the valve to a closed position.

A further object is to provide means associated with the thermoelectric valve actuator for manually opening the valve in the absence of electrical power supply, which manual means is automatically rendered inoperative upon a resumption of electrical power supply.

These and other objects and advantages will become apparent when reading the following description in connection with the accompanying drawings.

In the drawings:

Fig. 4 is an enlarged top plan view of the valve with the cover removed and with parts broken away for clearer illustration;

Fig. 6 is a sectional view taken on line 6—6 of Fig. 5;

Fig. 7 is a fragmentary elevational view taken on line 7—7 of Fig. 4;

Fig. 8 is a fragmentary elevational view taken on line 8—8 of Fig. 4;

Fig. 9 is a fragmentary elevational view taken on line 9—9 of Fig. 4; and

Figure 1:
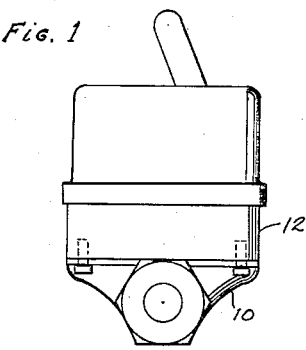
Fig. 1 is an end elevational view of a diaphragm-type gas valve constructed in accordance with the present invention.
Figure 2:
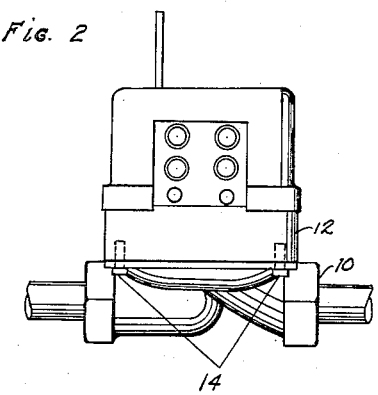
Fig. 2 is a side elevational view of the gas valve shown in Fig. 1.

The valve includes a lower body section 10 and an upper body section 12 which is attached to the lower body section by screws 14. A soft diaphragm member 16, clamped at its periphery between the upper and lower body sections, defines upper and lower chambers 18 and 20. The lower body section is provided with a threaded inlet boss 22 for connection of a gas supply line, a port 23 formed as a valve seat, and an outlet passage 24 leading to an outlet boss 21 which is threaded for connection of a pipe for conducting gas to the burner. The under side of diaphragm 16 is subjected to inlet pressure. The valve seat 23 is formed concentric with diaphragm 16, and the diaphragm carries a central pliable disc 25 on its underside adapted to engage the valve seat. Lying against the upper surface of the diaphragm 16 is a metal disc 26 against which bears a relatively light, downwardly acting spring 27. The underlying pliable disc 25 and the upper metal disc 26 are attached to the diaphragm as by a rivet.

Communication between the lower inlet chamber 20 and the upper chamber 18 is provided for by a horizontal passage 30, a vertical passage 28, a filter cavity 32, a horizontal passage 34, and a hollow screw plug 36 having one end 38 formed as a valve seat. An outlet or exhaust passage extending from chamber 18 to the exterior is also provided and comprises a hollow screw plug 40 and a passage 42 which is internally threaded at its outer end for connection of a lead-off pipe. The hollow screw plug 40 lies concentric with plug 36 and is provided with a valve seat 44 at its inner end spaced from valve seat 38. A double-faced valve element 46 carried on the free end of a pivoted arm 48 alternately engages the opposed valve seats 38 and 44 as the arm 48 is swung in opposite directions. The screw plug 40 is provided with a screw driver slot and is threadedly adjustable in an internally threaded bushing 47. The bushing 47 is also externally threaded and is screwed into passage 42 with its inner end abutting and compressing a packing element 49, which precludes any leakage past the threads of the hollow adjustable screw plug 40.

Figure 5:
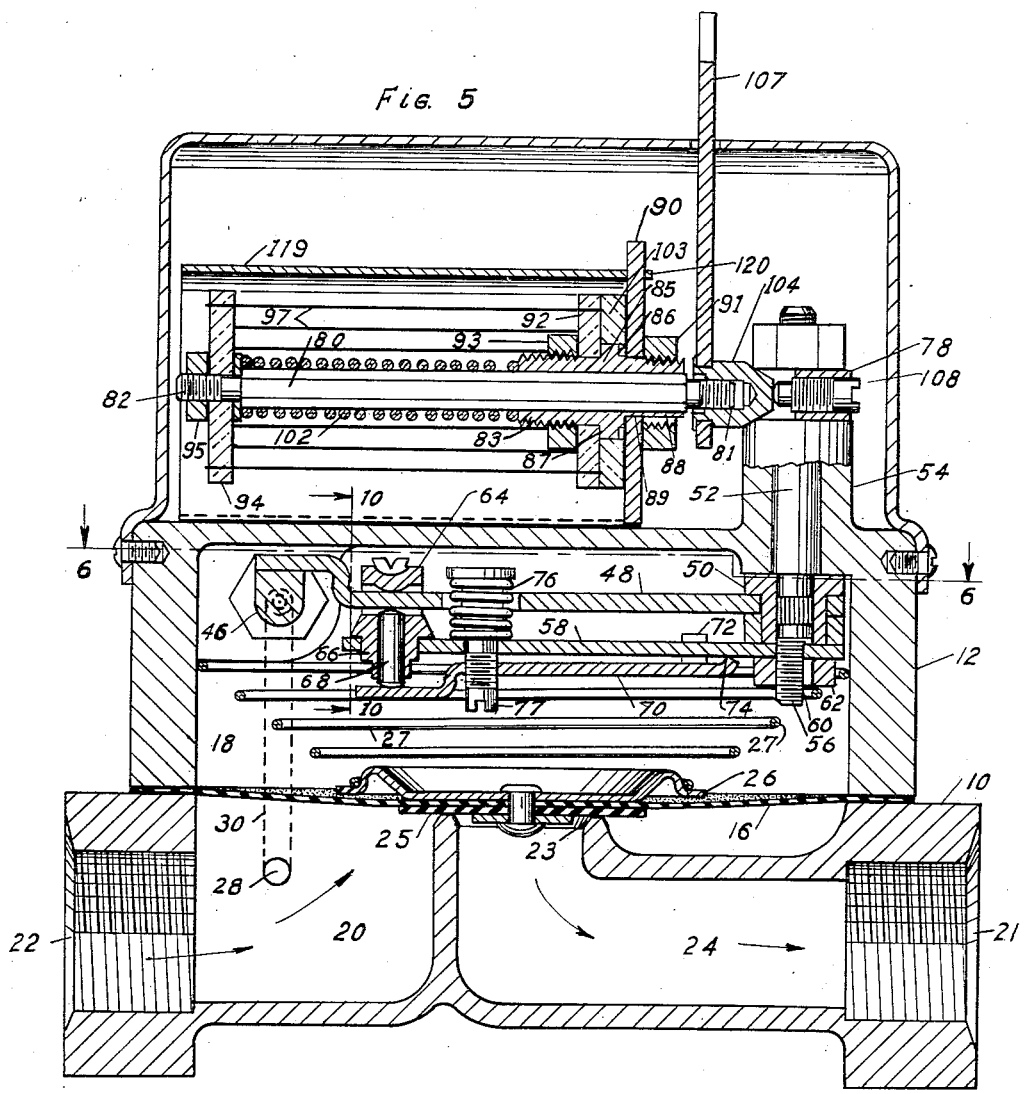
Fig. 5 is a sectional view taken on line 5—5 of Fig. 4.

The arm 48 is pivoted for free rotation on a shouldered hollow bushing 50, and the bushing 50 is press fitted on the lower reduced portion of a vertical shaft 52, see Fig. 5. The shaft 52 extends from chamber 18 upwardly and exteriorly of the upper housing section and is journalled in a vertical boss 54 on the upper surface of the housing section. The lower end of shaft 52 is provided with a screw threaded portion 56 on which is fixed one end of a second arm 58 underlying arm 48. The lower screw threaded portion of shaft 52 is provided with a flat surface 60, and arm 58 is provided with a D-shaped hole for receiving the flattened portion of the shaft so that it is keyed to the shaft for rotation therewith. A nut 62 retains arm 58 against a shoulder formed at the upper end of flat surface 60.

Figure 10:
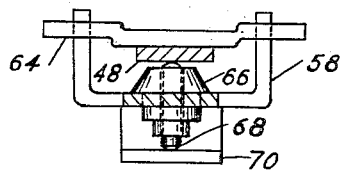
Fig. 10 is a detail view of the slip-friction connection taken on line 10—10 of Fig. 5.

At its free end, arm 58 carries a transverse friction plate 64 which overlies the upper surface of the valve arm 48 and a bushing 66 in which is slidably mounted a vertical pin 68 adapted to bear against the under surface of arm 48, see Fig. 10. The arm 58 also carries a parallel underlying arm 70 which is attached to arm 58 near its inner end by formed ears 72. The inner end of arm 70 is formed upwardly slightly at 74 so as to space the arm 70 somewhat from arm 58 and so as to provide a pivot point about which arm 70 may be rotated slightly in a vertical plane with respect to arm 58. The outer end of arm 70 engages the lower end of pin 68, and a spring 76 bearing against the upper surface of arm 58 and acting through a headed adjustment screw 77 threadedly engaged in arm 70 urges the outer end of arm 70 upward and, consequently, urges pin 68 upward against the under surface of valve arm 48. This arrangement provides a frictional connection between the freely pivoted valve arm 48 and the underlying arm 58, which is keyed to turn with vertical shaft 52. This frictional connection is intended to slip under certain conditions, and the amount of friction or the load which will cause slippage may be varied by turning the adjustment screw 77.

The upper exterior end of shaft 52 has an arm 78 keyed thereto for rotation therewith. Mounted on the upper surface of the upper housing section is a horizontally arranged actuator generally indicated at 79. The actuator 79 comprises a horizontal shaft 80 having an intermediate portion which is hexagonal in cross-section and having reduced screw threaded end portions 81 and 82. The shaft 80 is slidably received at one end in a bushing 83, which bushing is provided with a broached hole therethrough of hexagonal cross-section. The bushing 83 is threaded at both ends and has an intermediate enlarged diameter portion 85 providing opposed shoulders 86 and 87. One threaded end of bushing 83 is provided with a flat surface 88 and is received in a D-shaped aperture 89 in an end support plate 90. A portion of this threaded end of the bushing extends through plate 90 and is provided with an attaching nut 91.

The other end of bushing 83 receives a centrally apertured ceramic disc 92 which abuts the bushing shoulder 87 and is held rigidly against the shoulder by a nut 93. A second ceramic disc 94 is mounted on the free unsupported end of shaft 80 and is rigidly fixed thereto by means of a nut 95. The ceramic discs 92 and 94 are each provided with equally spaced peripheral slots 96 which receive the parallel lays of a continuous wire expansion element 97. The ends of the wire element 97 enter and exit at adjacent slots in ceramic element 94, and therebetween the wire element extends back and forth between the ceramic discs in parallel lays with the loops at each end extending over alternate peripheral segments, as indicated at 98. The ends of the wire element 97 are provided with stop dogs 99 which may be conveniently soldered thereon to prevent slipping through the slots, see Fig. 8, and the ends of the wire element are connected to circuit leads 130 and 140. The expanding wire element is preferably constructed of a nickel-chrome alloy and is of suitable diameter to provide the required mechanical strength and resistance to electrical current. A compression spring 102 surrounding shaft 80 biases the shaft 80 and ceramic disc 94 leftward, in Fig. 5, to maintain a tension on the parallel lays of the element 97.

Between ceramic disc 92 and support plate 90 is a ceramic spacing disc 103 which, when attaching nut 91 is tightened, bears tightly against the adjacent face of disc 92, thereby clamping the loops of wire element 97 at that end firmly between the two discs. With this provision, each loop of the wire element is mechanically connected to element 92 so that if, for any reason, the wire element is broken at any point, slippage of the wire element and, consequently, leftward movement of the rod 80 under urging of spring 102 is prevented by the intact loops. The wire element being continuous between terminals 99 will, however, upon breakage at any point therealong, break any electrical circuit which is otherwise completed through the element.

When a suitable electrical current is passed through the continuous wire element 97, it becomes heated, its parallel lays will expand rapidly permitting the spring 102 to move the ceramic disc 94 and shaft 80 leftward, and when electrical current is discontinued therethrough, the wire element cools quickly and contracts, thereby returning shaft 80 toward the right against spring 102. The rod 80 is preferably constructed of a material having a low coefficient of thermal expansion so as not to vary in length appreciably with ambient temperature changes or due to heat radiated from the wire element 97 when energized.

The right-hand end of shaft 80, in Fig. 5, carries in threaded engagement thereon a nut 104 on which is rigidly mounted a member having radially extending, integrally formed arms 105, 106, and handle 107. The nut 104 is provided with a frusto-conical point which is engaged by the end of an adjustment screw 108 carried by the arm 78. The arm 78 is biased in a clockwise direction and against nut 104, in Fig. 4, by a relatively strong spring 109. By swinging handle 107, the nut 104 is moved inwardly or outwardly on the end of shaft 80 causing arm 78 to be swung and, consequently, the valve arm 48 to be swung through the friction connection to move pilot valve 46 with relation to the valve seats 38 and 44. When handle 107 is swung manually in a direction to move arm 105 upwardly from the position shown in Fig. 7 to the position shown in Fig. 8, a notch 110 formed in the end of arm 105 is entered by the formed upper end of a vertically arranged, bi-metallic element 111 which when in its cold position, as shown, latches the arm 105 against return. The integrally formed arms 105, 106, and 107, as well as the nut to which they are fixed, are biased in the position shown in Fig. 7 by a spring 112 acting upwardly on arm 106.

The bi-metallic element is provided with a resistance heater 113 wound therearound which, when energized, heats the bi-metallic element causing its free upper end to warp leftward, in Fig. 8, thereby to release the arm 105 and permit its return, and consequently the return of the pilot valve 46 from the position to which it was moved by manipulation of handle 107. The bi-metallic element 111 is mounted at its lower end on a bracket 114 by screws 115, and the bracket is attached to the upper casing section 12 by screws 116. Leads 131 and 142 extend from the opposite ends of resistance heater 113 to circuit connections for its energization. The support plate 90, which supports the horizontally arranged actuator element, also forms the end plate of an open end housing 119 which houses the actuator. The support plate 90 is rigidly attached to the end of housing 119 by projecting tongs 120 which extend from the end of the housing, pass through apertures in plate 90, and are formed over. The housing 119 in turn is attached to the upper casing section 12 by screws 122 and 123 which pass through horizontally formed flanges 121.

A double-throw switch, generally indicated at 124, is also attached to the upper surface of upper casing section 12 by the screws 123. Switch 124 has an upper contact 125, a lower contact 126, and a movable contact 127 carried on a spring blade 128. The spring blade 128 is formed so as to normally hold contacts 125—127 closed and contacts 126—127 open. However, the arm 105, when in its returned position, in Fig. 7, presses downwardly on the upper surface of leaf spring 128 causing contacts 125—127 to open and contacts 127—126 to close. The switch has lead connections 129, 130, and 131 to contacts 125, 126, and 127.

Figure 3:
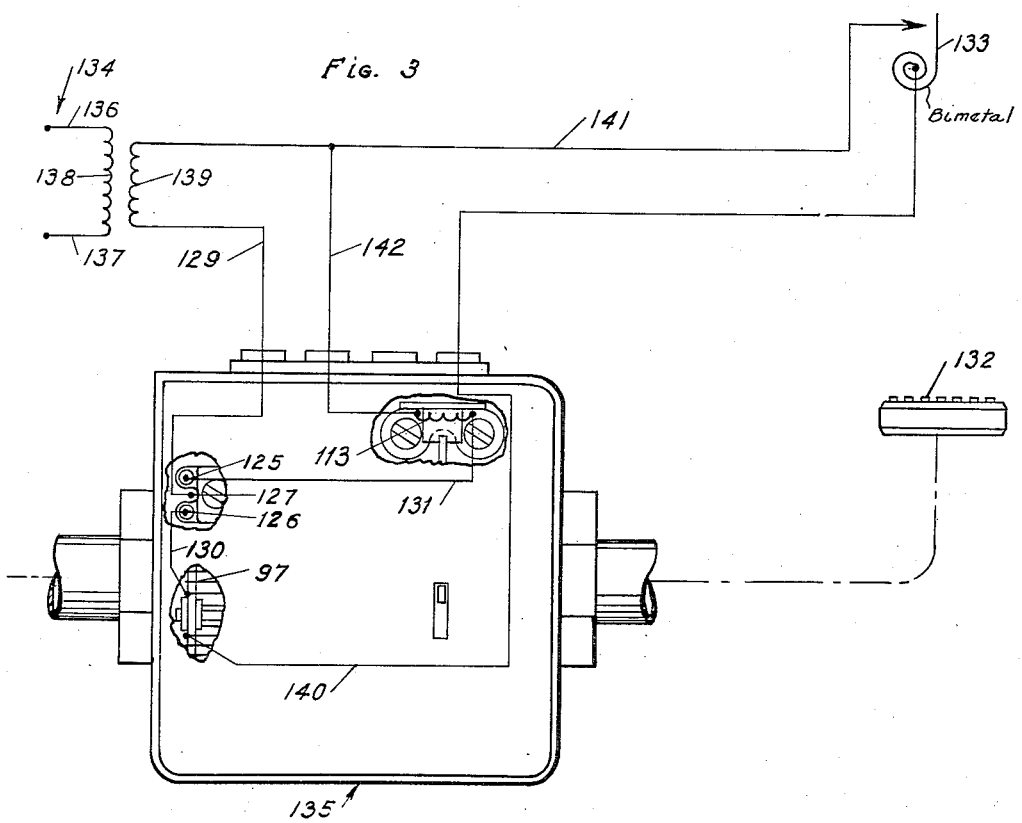
Fig. 3 is a schematic view of the valve in use as a burner control valve for a space heating system.

In Fig. 3, the valve is shown schematically in use as a burner control valve in a space heating system. In this view, a gas burner is indicated at 132, a space thermostat at 133, a source of electrical power at 134, and the valve is generally indicated at 135. Leads 136 and 137 of the transformer primary, indicated at 138, are for connection to a suitable source of electrical energy.

In normal operation, when the space thermostat is open, the valve actuator is de-energized and the valve is in a closed position. When in this position, pilot valve 46 is in engagement with valve seat 44, closing the exhaust vent from upper chamber 18. Under these conditions, inlet supply pressure is impressed on both upper and lower surfaces of diaphragm 16, and the spring 27 biases the diaphragm downward to close the valve. When the space thermostat closes demanding heat, a circuit is completed for the heating of expanding wire element 97. This circuit is traced from one side of the transformer secondary 139 through lead 129, to switch blade 128, through contacts 127—126, through lead 130, through element 97, and lead 140, through space thermostat 133, and through a lead 141 back to the other side of secondary 139. Heating of the element 97 causes its expansion which permits the shaft 80 to move leftward under spring 102 and arm 78 to rotate clockwise under spring 109, thereby moving valve arm 48 and valve 46 through the slip-friction connection to a position wherein communication between the lower inlet chamber 20 and upper chamber 18 is closed, and whereby the vent from chamber 18 is open to the exterior.

When this occurs, inlet pressure is applied to the underside of diaphragm 16 while the upper side is subjected to substantially atmospheric pressure. The relationship of the area of diaphragm 16 to the strength of spring 27 is such that the diaphragm is lifted by inlet pressure and fuel flows through the valve to the burner. When sufficient heat has been supplied to the space, the thermostat opens breaking the circuit to element 97. The element 97 then cools and contracts, reversing the movement of parts and restoring inlet pressure to upper chamber 18. The action of the valve is rapid in both opening and closing. In models which applicant has constructed, the operating time in closing and opening is less than three seconds and obviously it is entirely noiseless.

In the event of a temporary failure of electrical power, the valve may be opened manually by swinging handle 107 from its normally biased position in Fig. 7 to the latched position shown in Fig. 8. This action screws nut 104 inwardly on the end of shaft 80 permitting the arm 78 to be rotated and causing pilot valve 46 to close on seat 38, thereby cutting off communication between the lower and upper chambers and opening the vent to atmosphere which results in the diaphragm being lifted from seat 23 by inlet pressure. When handle 107 is manually swung to open the valve, the downward pressure by arm 105 on switch blade 128 is removed and contacts 125—127 make while contacts 126—127 break. This establishes a circuit for the resistance heater 113 which is independent of the space thermostat. This circuit is traced from one side of secondary winding 139 through lead 129, through switch contacts 127—125, through a lead 131, through resistance heater 113, through a lead 142, and through lead 141 back to the other side of secondary 139.

Upon resumption of the electrical power supply, the resistance heater 113 is energized and the bi-metallic element 111 is heated, regardless of the position of the space thermostat at that time. When the bi-metallic element becomes heated sufficiently it warps, releasing the arm 105, and return spring 106 returns the nut 104 to its normally extended position on the end of shaft 80. As arm 105 returns, switch 124 is again depressed, opening contacts 125—127 to break the resistance heater circuit and closing contacts 126—127 to again complete a circuit for expanding wire element 97 through the space thermostat.

The provision of the slip-friction connection between arm 58 and valve arm 48 results in the utilization of the initial portion of the expansion and contraction of the wire element 97 as it is heated or begins to cool, which results in rapid action of the valve. Also, the slip-friction connection provides for any stretch or elongation of the wire element 97 which normally occurs due to heating under tension during use, particularly during the breaking in period.

The foregoing is intended to be illustrative and not limiting, the scope of the invention being set forth in the appended claims.

We claim:

1. In a device of the class described, a valve, support structure, a shaft having a disc member rigidly attached to one end thereof, a second, centrally perforated disc member mounted on said support structure and slidably receiving the other end of said shaft, said discs both being provided with peripheral notches, a continuous, thermally expansible wire conductor laid back and forth between said discs and successively engaging the peripheral notches in said discs in a manner to simulate a squirrel cage, means to anchor the ends of said continuous conductor, a compression spring surrounding said shaft and bearing oppositely against said discs to tension the lays of said conductor, means to pass current through said conductor under certain conditions to heat it sufficiently to effect functional expansion thereof, and means operatively connecting said shaft with said valve for the operation thereof.

2. In a device of the class described, a support member, an actuator rod slidably mounted at one end in said support member, a plate member carried on the other end of said rod and rigidly attached thereto, each of said members being provided with a series of radial studs arranged in a circle about said rod, a continuous, thermally expansible wire conductor strung back and forth between said members and successively looped around said studs, means to anchor the ends of said conductor, and spring means acting on said plate member in a direction to tension the parallel lays of said conductor.

3. In a device of the class described, a support member, a member movably mounted on said support member, a thermally expansible wire conductor connecting said members, spring means acting on said movably mounted member in a direction to tension said conductor, an actuator element adjustably mounted on said movable member, manual means for adjustably positioning said actuator element with relation to said movably mounted member, spring means biasing said actuator element to one adjusted position, movable detent means normally biased in an operative position to retain said actuator element in another adjusted position when moved to said other position against said spring means by said manual means, and electrically operated means for moving said detent means to an inoperative position thereby to release said actuator element.

4. In a fluid pressure operated valve, a pilot valve for controlling the application of fluid pressure to the main valve for its actuation, a support member, an actuator member movably mounted thereon, a thermally expansible wire conductor connecting said members, spring means acting on said actuator member in a direction to tension said wire conductor, means for passing sufficient electrical current through said conductor under certain conditions to effect the functional expansion thereof, means forming an operative connection between said actuator member and said pilot valve including an element mounted for adjustment on said actuator member, spring means biasing said adjustably mounted element in a first position, manual means for moving said adjustable element in an opposite direction to a second position, electrically operated detent means normally biased in an operative position when de-energized to retain said adjustably mounted element in said second position when moved to said second position against said spring by said manual means, and normally open switching means operated to a closed position when said adjustable element is moved to its second position for completing an energizing circuit for said electrically operated means, whereby said detent is moved to an inoperative position and said adjustably mounted element is released to return to its first position.

5. In a device of the class described, a support member, an actuator rod constructed of material having a relatively low coefficient of expansion slidably mounted at one end in said support member, a plate member carried on the other end of said rod and rigidly attached thereto, each of said members being provided with a series of spaced radial projections arranged in a circle about said rod, a continuous, thermally expansible wire conductor constructed of material having a relatively high coefficient of expansion, said wire conductor being strung back and forth between said members and successively looped around said radial projections, means to anchor the ends of said conductor, and spring means acting on said plate member in a direction to tension the parallel lays of said conductor.

6. In a device of the class described, a body member, a shaft journalled therein, a first lever keyed to said shaft, a support member adjacent said shaft, an actuator member movably mounted on said support member and having an operative connection with said lever, a thermally expansible wire conductor connecting said support member and actuator member, spring means acting upon said actuator member in a direction to tension said wire conductor, a valve, a second lever having one end mounted for rotation on said shaft and being operatively connected to said valve at its free end, a third lever adjacent to and lying generally parallel with said second lever, said third lever being fixed at one end on said shaft and having frictional engagement at its free end with the free end of said second lever.

7. In a device of the class described, a support member, an actuator rod slidably mounted at one end in said support member, a plate member carried on the other end of said rod and rigidly attached thereto, each of said members being provided with an annular series of radial stud elements arranged concentrically around said rod, a continuous, thermally expansible wire conductor strung back and forth between said members and successively looped around said stud elements, means to anchor the ends of said wire conductor, spring means biasing said shaft in a direction to tension the parallel lays of said conductor, and a clamping element bearing against the outer surface of one of said members and engaging the loops of said wire conductor, thereby to tightly clamp said loops between said clamping element and the outer surface of said member.

References Cited in the file of this patent

UNITED STATES PATENTS

| | | |
|---|---|---|
| 2,038,748 | Mantz | Apr. 28, 1936 |
| 2,396,541 | Taylor | Mar. 12, 1946 |
| 2,489,896 | Kempton | Nov. 29, 1949 |
| 2,731,230 | Schell | Jan. 17, 1956 |

FOREIGN PATENTS

| | | |
|---|---|---|
| 135,853 | Switzerland | 1929 |